Nov. 9, 1954 W. H. NEWELL 2,693,709
INTEGRATOR WITH ONE FRICTION SURFACE
Filed Dec. 19, 1952 2 Sheets-Sheet 2
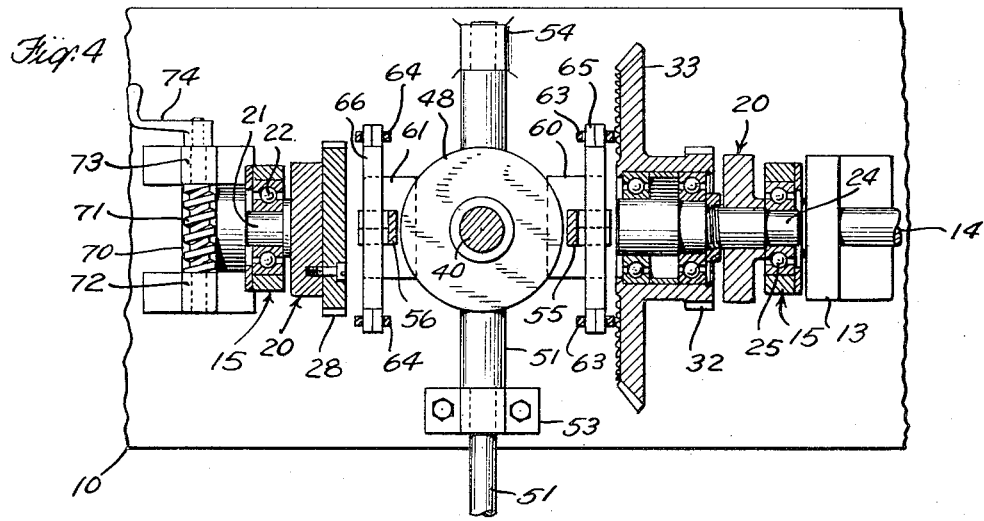
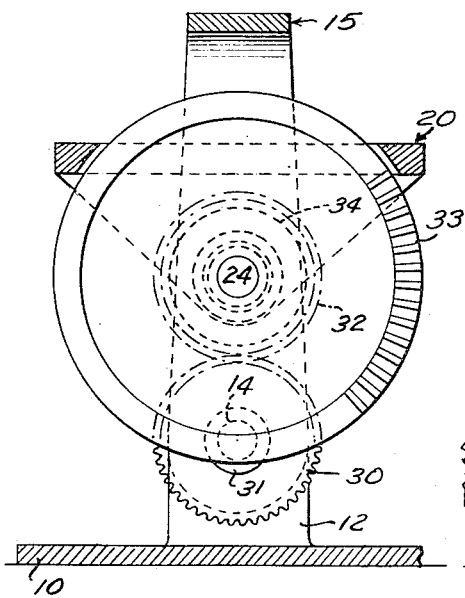
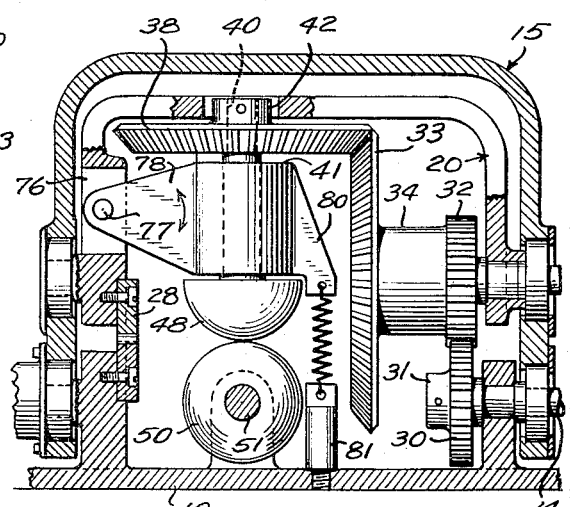
INVENTOR.
WILLIAM H. NEWELL
BY Victor D. Borst
ATTORNEY

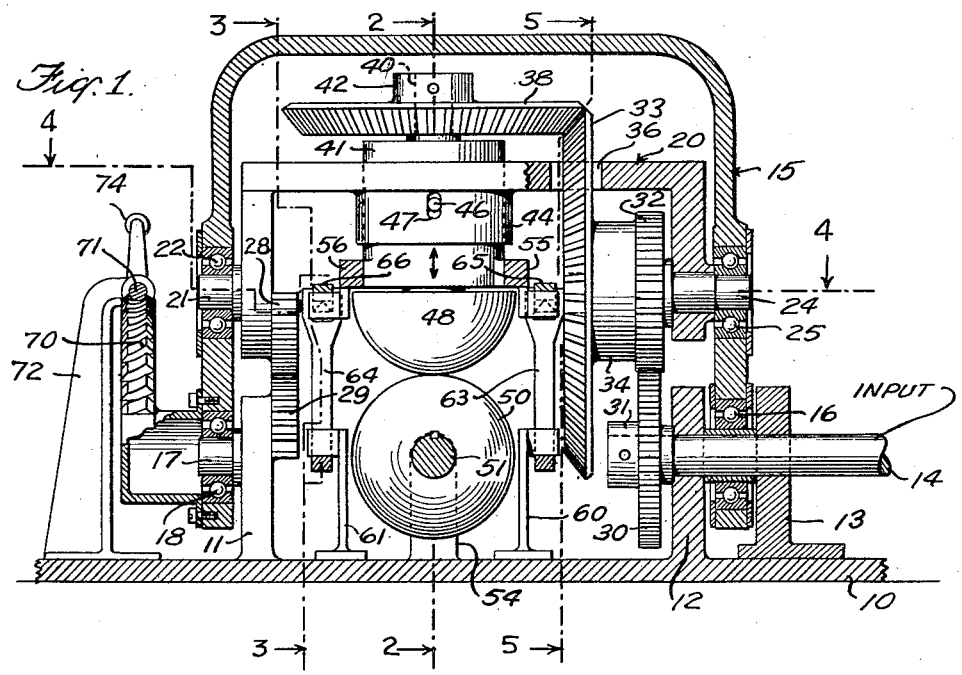

United States Patent Office 2,693,709
Patented Nov. 9, 1954

2,693,709

INTEGRATOR WITH ONE FRICTION SURFACE

William H. Newell, Mount Vernon, N. Y., assignor to The Sperry Corporation, a corporation of Delaware Application December 19, 1952, Serial No. 326,923

6 Claims. (Cl. 74—198)

This invention relates to a variable speed device and particularly to the ball type of mechanical integrator.

One of the principal objects of the present invention is to provide a mechanical integrator the driving and driven surfaces of which are limited in number to two. Mechanical ball integrators have customarily been complex mechanisms encumbered with many driving and driven parts. Those of the friction type largely depend for their accuracy on the extent to which slippage or lost motion can be eliminated during operation. The advantage of limiting the number of friction bearing surfaces is apparent.

In order to insure accurate translation of motion it has been found necessary to urge the contacting surfaces together under considerable pressure. Such practice, however, has resulted in substantial wear due to the necessity of altering the relative angular positions of the surface when introducing new variable quantities into the device. This wear and resulting distortion of the surfaces is due to the manner of changing the relative positions of the surfaces which has been to forcibly slide or slip the one over the other without actually changing the point of contact on one of the surfaces in the new position. To effect a change of relative position of the surfaces in this device, one surface is rotated over the other altering the points of contact on both surfaces. This rotational instead of sliding translation to the new position eliminates wear by abrasion on the operating surfaces.

In general the variable control device comprises a ball which is constrained to rotate on an output shaft being in driven contact with a half-ball of equal radius which rotates on an axis normal to the output shaft. The half-ball is supported by a yoke which is adapted to pivot on an axis of the half-ball and is pivotally supported by an outer yoke which is pivotal about an axis of the ball parallel to the pivotal axis of the inner yoke. In effect the rotation of the outer yoke imparts a translatory movement to the inner yoke and its supported half-ball about the driven ball and thereby causes the half-ball to rotate on its own axis which imparts an additional increment of rotational movement to the inner pivotal yoke. Because the radii of the operating surfaces are known, the relative movement between the inner and outer yokes can be determined. In this device the radii are equal and, therefore, the relative movement of the two members is in a 2:1 ratio. Thus a change in the pivotal position of the outer yoke results in a change of angular position of the inner yoke and its supported half-ball of twice the amount and the change in the latter's angular position is effected without sliding.

Mounted on the inner yoke is a sector gear which engages a quadrant gear secured to the base. The pitch diameters of the sector and quadrant gears are equal to the diameters of the driving and driven members respectively. There is accordingly insured a positive translation of angular motion between input and output. The precise arrangement for rotating the half-ball to drive the output ball and pivotally supporting the half-ball in contact with the output ball is described in the following specification and accompanying drawings.

Fig. 1 is a longitudinal section of the variable control device;

Fig. 2 is a transverse section on the line 2—2 of Fig. 1;

Fig. 3 is a transverse section on the line 3—3 of Fig. 1 with the elements in a different operative position from Fig. 2;

Fig. 4 is a plan on the line 4—4 of Fig. 1;

Fig. 5 is a transverse section on the line 5—5 of Fig. 1; and

Fig. 6 is a longitudinal section showing a modification of the invention.

A base 10 has mounted thereon base brackets 11, 12 and 13. The brackets 12 and 13 are adapted to carry input shaft 14 for rotation therein. One arm of outer U-shaped yoke 15 is carried by bracket 11 by means of a fixed shaft 17. This end of the outer member has a ball bearing 18 on the shaft 17 which together with ball bearing 16 on input shaft 14 provides a pivotal axis for the outer yoke 15.

An inner U-shaped yoke 20 is pivotally supported within the outer yoke 15 by that member. One side of inner yoke 20 is mounted on yoke shaft 21 which is rotatably carried on ball bearing 22 retained in the arm of the outer yoke 15 suitably above bearing 18. The other side of the inner yoke 20 is similarly supported by the outer yoke 15 on stub shaft 24 which is mounted in the outer yoke 15 to rotate therein on bearing 25 spaced above bearing 16 in the arm of the outer member 15 the same distance as the bearing 22 is spaced above bearing 18 in the opposite arm. Inner yoke 20 is adapted to rotate freely on stub shafts 21 and 24 in the outer yoke 15 thus permitting relative pivotal movement between the two yokes.

Affixed as by set screws to the inner face of the arm of yoke 20 is a sector gear 28. The axis of rotation for the sector gear 28 is the pivotal axis of inner yoke 20. The sector gear 28 is mounted on the arm of yoke 20 to engage quadrant gear 29 which is secured to the inner face of bracket 11 in a suitable manner. The operation of yoke shaft 21, therefore causes sector gear 28 to rotate on the stationary quadrant gear 29 carrying with its inner yoke 20 and the outer yoke is thereby caused to pivot on the axis of shafts 14 and 17. The rotation of the sector gear 28 causes the inner yoke 20 to pivot on the common axis of the outer yoke 15 and quadrant gear 29. A compound motion (see Fig. 3) is thus imparted to the inner yoke 20 and its associated elements which will be later described in further detail.

Mounted on the inner end of input shaft 14 is gear 30 the hub 31 of which is pinned to the shaft. Immediately above and mounted on shaft 24 to engage gear 30 is the gear 32 which is locked to bevel gear 33 by means of spacer hub 34. Gears 32 and 33 rotate in unison on shaft 24 and bevel gear 33 is accordingly driven from the input shaft 14. The radius of the bevel gear 33 is larger than the pivotal radius of yoke 20. There is provided, therefore, a transverse slot 36 in the inner member 20 to provide clearance for bevel gear 33.

Bevel gear 38 is mounted on spindle 40 by means of a lock pin through its hub 42 to engage bevel gear 33. Sufficient space allowance is made between inner yoke 20 and outer member 15 to permit bevel gear 38 and its hub 42 to pass the outer yoke during operation.

Spindle 40 passes through sleeve 41 and rests in thrust bearings carried by top and bottom plates thereof. Sleeve 41 is guided axially by a housing 44 rigidly mounted on the inner yoke 20 with its axis perpendicular to that of input shaft 14. Mounted on sleeve 41 are stubs 46 adapted to slide in slots 47 of the housing 44. The engagement of the stubs 46 in slots 47 permits relative axial movement of the sleeve and shaft but prevents rotative displacement between the sleeve and housing. Secured to the bottom end of spindle 40 is a semi-spherical ball 48 which provides the operative driving surface for the variable drive mechanism. The driven surface is provided by a ball 50 which is keyed to output shaft 51. The output shaft is rotatably supported by brackets 53 and 54.

Driving ball 48 contacts the driven ball 50 under spring pressure. Attached to the lower portion of the housing 41 are shoulder pieces 55 and 56 having spring engaging arm portions with horizontally disposed knife edges to permit frictionless pivotal movement of the driving ball 48 and its associated operational elements. On either side of the driven ball 50 are bracket supports 60 and 61 mounted on the base 10. The brackets have arms with complementary knife edges on which the bottom cross pieces of U-brackets 63 and 64 bear. The upper portions of the arms of the U-brackets 63 and 64 have slots through which flat springs 65 and 66 extend. The pressure exerted by the flat springs on the shoulder pieces 55 and 56 must be sufficient to insure accurate translation of motion between the balls.

Control input values may be introduced in any fashion. Manual means are shown. Worm gear quadrant 70 mounted coaxially on yoke 15 is irreversibly driven by worm 71 supported in brackets 72 and 73. The worm gear is driven from the worm in either direction. A hand crank is provided for operating the worm.

A modification of the supporting means for the driving half-ball 48 is illustrated in Fig. 6. There is mounted in the sides of slot 76 in an arm of the inner yoke 20 a pin 77 on which a plate 78 attached to sleeve 41 can pivot in the plane of inner yoke 20. A member 80 is secured to the sleeve 41 on the other side and a coil spring is connected to the member 80 and bracket 81 mounted in base 10 as a consequence of which the half-ball 48 is urged toward the driven ball 50 by means of an alternative construction.

The invention is not limited to the patricular details of apparatus shown and described, but can be adapted to variations within the appended claims.

What is claimed is:

1. A variable speed device comprising a spherical driven member constrained to rotate about an output axis, a driving spherical member having an axial drive spindle secured thereto, an outer yoke pivotal about an axis of the driven member normal to the output axis, an inner yoke supporting the driving member in contact with the driven member and pivoted to the outer yoke on an axis of the driving member parallel to the pivotal axis of the outer yoke, means for driving the said spindle about its axis, and means for effecting pivotal movement of the inner yoke proportional to its movement of translation when the outer yoke is moved about its pivot.

2. A variable speed device comprising an output shaft, a spherical driven member mounted to rotate on said output shaft, a driving spherical member having an axial drive spindle secured thereto, an outer yoke pivotal about an axis of the driven member normal to the output axis, an input shaft which extends and rotates within said outer yoke, an inner yoke supporting the driving member in contact with the driven member and pivoted to the outer yoke on an axis of the driving member parallel to the pivotal axis of the outer yoke, means for driving the said spindle about its axis, and means for effecting pivotal movement of the inner yoke proportional to its movement of translation when the outer yoke is moved about its pivot.

3. A variable speed device comprising an output shaft, a spherical driven member mounted to rotate on said output shaft, a driving spherical member having an axial drive spindle secured thereto, an outer yoke pivotal about an axis of the driven member normal to the output axis, an input shaft which extends and rotates within said outer yoke, an inner yoke supporting the driving member in contact with the driven member and pivoted to the outer yoke on an axis of the driving member parallel to the pivotal axis of the outer yoke, means for driving the said spindle about its axis, means for effecting pivotal movement of the inner yoke proportional to its movement of translation when the outer yoke is moved about its pivot, and means for insuring that the said driving spindle is pivoted with the said inner yoke including a sleeve partially enclosing the spindle and a housing partially enveloping the said sleeve being secured to the said inner yoke.

4. A variable speed device comprising an output shaft, a spherical driven member mounted to rotate on said output shaft, a driving spherical member having an axial drive spindle secured thereto, an outer yoke pivotal about an axis of the driven member normal to the output axis, an input shaft which extends and rotates within said outer yoke, an inner yoke supporting the driving member in contact with the driven member and pivoted to the outer yoke on an axis of the driving member parallel to the pivotal axis of the outer yoke, means for driving the said spindle about its axis, means for effecting pivotal movement of the inner yoke proportional to its movement of translation when the outer yoke is moved about its pivot, and means for insuring that the said driving spindle is pivoted with the said inner yoke including a sleeve partially enclosing the spindle and a plate pivoted on an arm of the said inner yoke being secured to the sleeve.

5. A variable speed device comprising an output shaft, a spherical driven member mounted to rotate on said output shaft, a driving spherical member having an axial drive spindle secured thereto, an outer yoke pivotal about an axis of the driven member normal to the output axis, an input shaft which extends and rotates within said outer yoke, an inner yoke supporting the driving member in contact with the driven member and pivoted to the outer yoke on an axis of the driving member parallel to the pivotal axis of the outer yoke, a fixed quadrant gear having the same pitch diameter as the diameter of the said driven member, a sector gear on one end of the inner yoke having the same pitch diameter as the said driving member and engaging the said quadrant gear whereby the relative position of the inner yoke to the outer yoke is maintained, means for driving the said spindle about its axis, and means for effecting pivotal movement of the inner yoke proportional to its movement of translation when the outer yoke is moved about its pivot.

6. A variable speed device as defined in claim 2 whereby an irreversible meshing worm gear and worm wheel are connected to said outer yoke to hold the outer and inner yokes in their relative pivotal positions and the driving spherical member is urged toward the driven spherical member under spring pressure.

References Cited in the file of this patent

UNITED STATES PATENTS

| Number | Name | Date |
|---|---|---|
| 305,714 | Schulze-Berge | Sept. 23, 1884 |
| 1,416,158 | Balcker | May 16, 1922 |
| 1,793,571 | Vaughn | Feb. 24, 1931 |

FOREIGN PATENTS

| Number | Country | Date |
|---|---|---|
| 129,093 | Germany | Apr. 1, 1902 |
| 928,894 | France | June 16, 1946 |
| 1,005,905 | France | Jan. 9, 1952 |